E. L. HOLMES.
GAS GOVERNOR.
APPLICATION FILED MAR. 8, 1909.
966,096.
Patented Aug. 2, 1910.
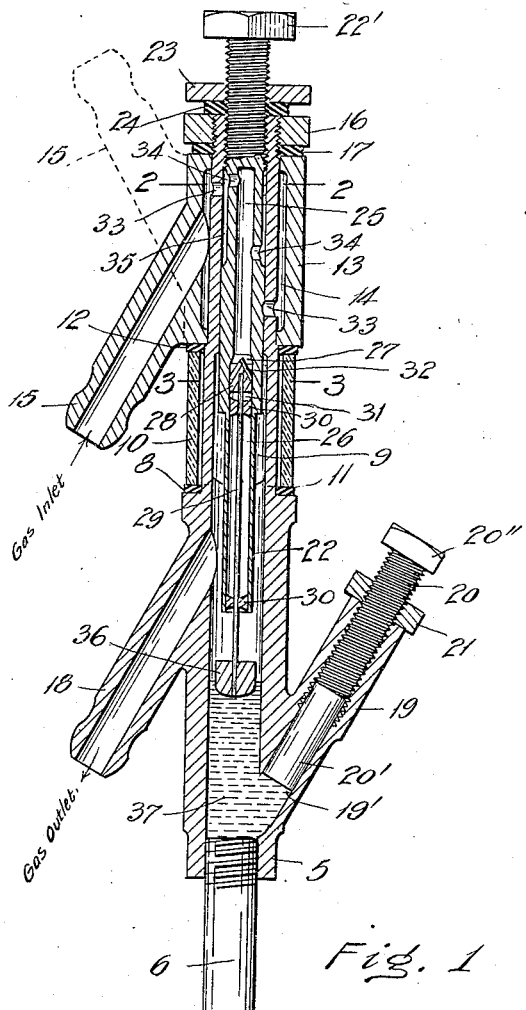
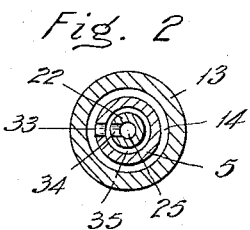
Fig. 2
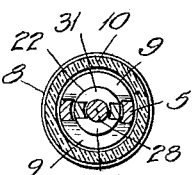
Fig. 3
Fig. 1
WITNESSES:
E. H. Alvord
H. Barnes
INVENTOR:
Edward L. Holmes
BY
Pierre Barnes
ATTORNEY.

UNITED STATES PATENT OFFICE.

EDWARD L. HOLMES, OF SEATTLE, WASHINGTON.

GAS-GOVERNOR.

966,096.

Specification of Letters Patent. Patented Aug. 2, 1910.

Application filed March 8, 1909. Serial No. 482,076.

*To all whom it may concern:*

Be it known that I, EDWARD L. HOLMES, a citizen of the United States, residing at Seattle, in the county of King and State of Washington, have invented certain new and useful Improvements in Gas-Governors, of which the following is a specification.

This gas governor is intended more particularly for use with linotype machines for regulating the temperature of the melting pot thereof by an increase or a diminution of the gas which is supplied to the heating-burner, but it may be used in other places whereat an automatically heat-controlled valve is desirable.

The object of the invention is the provision of an improved regulating valve for gaseous fuels which will regulate the flow of such agent to maintain a flame proportionate to the service demanded and wherein the valve will be operative for a relatively long time after it has been once adjusted.

The invention consists in the novel construction, adaptation and combination of parts, as will be hereinafter described and claimed, with reference to the accompanying drawings, wherein—

Figure 1 is a vertical cross sectional view of devices embodying my invention. Figs. 2 and 3 are horizontal sections taken on lines 2—2 and 3—3, respectively, of Fig. 1.

In carrying out my invention, I employ an upright tubular casing 5 which is open at both the top and bottom ends the latter end being provided with internal screw-threads and the former with external screw-threads. Into the bottom end is screwed a pipe 6 making communicative connection with a closed vessel 7 which is positioned, as in an aperture of the melting-pot structure P of a linotype machine. Intermediate of the length of said casing it is provided with an annular shoulder 8 and thereabove the casing is formed to be of less diameter than the part below. Extending upwardly from said shoulder and upon diametrically opposite sides the casing is cut away to afford openings 9, as shown in Figs. 1 and 3. Surrounding the casing about said openings is a glass tube 10 with a packing gasket 11 between the glass tube and said shoulder and another gasket 12 above; and seated upon the latter is a sleeve 13. This sleeve is internally recessed to provide an annular cavity 14 between the sleeve and the casing. A branch 15 is formed to provide a hose-nipple upon said sleeve and is arranged to have its axis inclined from the axis of the sleeve and by placing the sleeve upon said casing with one or the other ends at the bottom the nipple may be directed downwardly or upwardly, as may best accommodate the hose connection with the gas supply pipe. These two positions of the nipple are represented by full and broken lines, respectively, in Fig. 1. A nut 16 engages the aforesaid external screw-thread at the upper end of the casing for retaining the sleeve in adjusted position and to make a non-leakable joint between the nut and the sleeve a gasket 17 is introduced between these members. Another hose-nipple 18 is provided upon the casing to make communication with the interior of the casing and at a short distance below the plane of the shoulder 8. This nipple is for the gas connection with the burner (not shown in the drawings) which serves to furnish the heat to operate said melting pot. A branch 19 is provided in the casing to open into the same near the bottom and is screw-threaded at its outer end for the threaded portion of a bolt 20 whose inner end 20' is cylindrical and fitted within the bore 19' of this branch. A head 20'' is provided upon said bolt for adjustably screwing the same in or out, and a jam-nut 21 is provided for securing the bolt in adjusted positions.

Extending axially within the casing is a cylindrical member 22 which is provided in proximity to its top with a screw-thread to adjustably engage the member with the internal screw-threads at the top of the casing 5 and is provided with an integral head 22' for adjustment purposes and through the offices of a jam-nut 23 the member is locked in adjusted positions. A gasket 24 may advantageously be used between this nut and the top end of the casing to make a gas-tight joint between the two. The member 22 is axially bored, as at 25, from its lower end to within a short distance of its top and is then counter-bored to provide a cavity 26 which terminates at about the mid-length of the member in a conical shoulder 27 which constitutes a seat for a valve 28. Said valve 28 is fixedly connected to the upper end of a stem 29 which extends through guide-blocks 30 inserted in the member and having at the lower end of the stem a body 36. Just below the valve seat the member 22 is cut away to provide diametrically opposite openings 31 wherethrough the action of the valve may be observed through the glass tube 10 and the openings 9 of the casing. The openings 31 likewise afford a passage by the valve for the flow of the gas to the under side of the same. A small slot 32, constituting a by-pass, is provided upon the face of the valve in order that a relatively small flow of gas will pass by the valve even when the latter is in close contact with its seat 27.

One or more openings 33 are provided in the casing to make communication from the chamber about the casing to an annular space 35 obtained by a recess in the peripheral surface of the member 22 whence communication is had with the interior of said member by holes 34 opening into the bore 25 above the valve seat.

The operation of the invention may be described as follows: A liquid, indicated by the numeral 37, desirably mercury, is introduced in to the casing to fill the casing 7, the connecting pipe 6, and to a height in the casing sufficient to float the body 36 at such an elevation as to support the valve at a small distance below the valve seat 27. This may be ascertained by an inspection of the position of the valve through the glass 10 and the openings 9 and 31 of the casing and member 22. After the device has been thus charged with the liquid the branch 19 is closed by the insertion of the bolt 20. Whereupon the gas for heating the melting-pot is allowed to flow into the apparatus through the nipple 15 and thence by the valve and through the outlet nipple 18 to the burner. After the burner has been operative for some time the vessel 7 is influenced thereby to heat the contained liquid with a consequent expansion or an increase in its volume which effects the raising of the upper surface of the same to elevate the valve 28 through the flotative properties of the body 36. If the valve closes before the temperature of the molten metal in the pot P is at a desired degree; then the bolt 20 is retracted to afford more space to the occupancy of the liquid, and if the temperature of such metal ascends above that at which it is desired to maintain it then the bolt 20 is adjusted to extend farther into the casing to reduce the space available to the liquid with a corresponding elevation of its surface and an earlier closing of the valve. Adjustment of the valve may also be obtained through manipulation of the member 22 to cause the same to protrude to a greater or less extent into the casing to compensate for the gradual loss of the liquid which may take place. When properly adjusted the valve will respond to slight variations in the temperature of the pot and effect the regulation of the heat by admitting more or less gas to the burner.

By the provision of the slot 32 in the valve it is evident that the gas will never be entirely interrupted and thereby a small flame is maintained at the burner even when the valve is closed against its seat. The flow or quantity of gas delivered to the burner is, in this invention, regulated by a valve which is actuated through the offices of a heat expansible medium which is remote from the course taken by the gas in its passage through the apparatus. And furthermore, there is but a relatively small surface of the liquid exposed to the action of the gas by reason of the area occupied by the float, resulting in eliminating to a large extent of the disintegration and loss of the mercury (where it is employed) through the chemical affinity of the latter for certain constituents of the gas, with practically little loss or diminution as to volume of the liquid and the avoidance of the necessity of frequent adjustments of the valve.

What I claim, is—

1. A gas regulating valve, comprising a casing provided with inlet and outlet openings, a chambered member extending into the casing and provided intermediate its length with a conical valve-seat, the chamber of said member having communication above said valve-seat with said inlet opening and with the outlet opening below said seat, a valve, a stem for the valve, and extending downwardly therefrom, a flotative body secured to the lower end of the stem, a sight glass mounted upon said casing for viewing the movements of said valve, a vessel, and a pipe connection between the vessel and the casing below said outlet opening.

2. In apparatus of the class described, the combination of a liquid container, a casing having a gas outlet opening extending through a downwardly directed nipple, a chambered sleeve provided with a gas inlet opening extending through a nipple arranged in angular relation to the axis of the sleeve, said sleeve being adapted to be reversibly mounted upon the casing whereby the nipple may be directed upwardly or downwardly, means to secure the sleeve to said casing, a member secured to the top of the casing and terminating at below said gas outlet opening, a valve operative within said member and arranged to regulate the flow of gas between the aforesaid inlet and outlet openings, and means controlled by the expansion and contraction of a liquid due to variations in its temperature for regulating the movements of the valve.

3. In an apparatus of the class described, a casing provided with an outlet, a sleeve surrounding said casing and provided with an inlet, said casing provided with means for establishing communication between the interior thereof and the interior of said sleeve, an adjustable hollow tubular member extending in said casing and provided with means for establishing communication between the interior of the member and the upper portion of said casing, said tubular member further provided at a point removed from one end with a valve seat further having below said valve seat outlets for establishing communication between the interior of the member and the lower portion of said casing, a valve arranged in the lower portion of said member and adapted to engage said seat for closing said outlets to the upper portion of said member, and a float-operated valve stem projecting into said member and connected to the valve and adapted to operate the same.

4. In an apparatus of the class described, a casing provided with an outlet, a sleeve surrounding said casing and provided with an outlet, said casing provided with means for establishing communication between the interior thereof and the interior of said sleeve, an adjustable hollow tubular member extending in said casing and provided with means for establishing communication between the interior of the member and the upper portion of said casing, said tubular member further provided at a point removed from one end with a valve seat further having below said valve seat outlets for establishing communication between the interior of the member and the lower portion of said casing, a valve arranged in the lower portion of said member and adapted to engage said seat for closing said outlets to the upper portion of said member, and a float-operated valve stem projecting into said member and connected to the valve and adapted to operate the same, said valve provided with a by-pass for establishing communication between the upper portion of said member and the lower portion of said casing when the valve engages the seat.

5. In an apparatus of the class described, a casing provided with an outlet, a sleeve surrounding said casing and provided with an outlet, said casing provided with means for establishing communication between the interior thereof and the interior of said sleeve, an adjustable hollow tubular member extending in said casing and provided with means for establishing communication between the interior of the member and the upper portion of said casing, said tubular member further provided at a point removed from one end with a valve seat further having below said valve seat outlets for establishing communication between the interior of the member and the lower portion of said casing, a valve arranged in the lower portion of said member and adapted to engage said seat for closing said outlets to the upper portion of said member, and a float-operated valve stem projecting into said member and connected to the valve and adapted to operate the same, said valve provided with a by-pass for establishing communication between the upper portion of said member and the lower portion of said casing when the valve engages the seat, the inlet of said sleeve arranged above said valve seat and the outlet of said casing arranged below said valve seat.

EDWARD L. HOLMES.

Witnesses:
  HORACE BARNES,
  E. H. ALVORD.